H. M. TAYLOR.
COOKING UTENSIL.
APPLICATION FILED JULY 1, 1907.
951,409.
Patented Mar. 8, 1910.
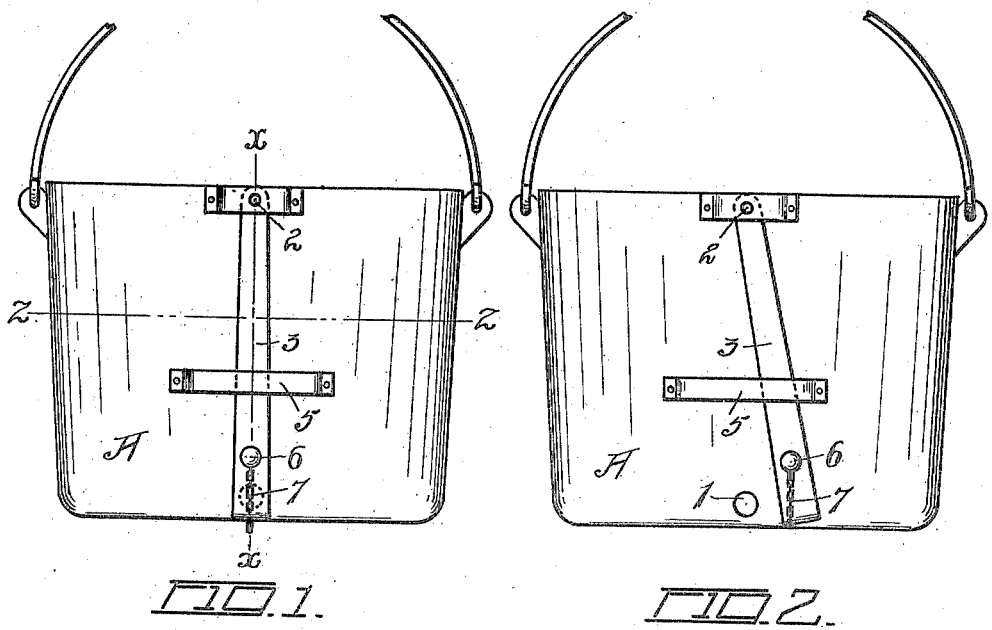
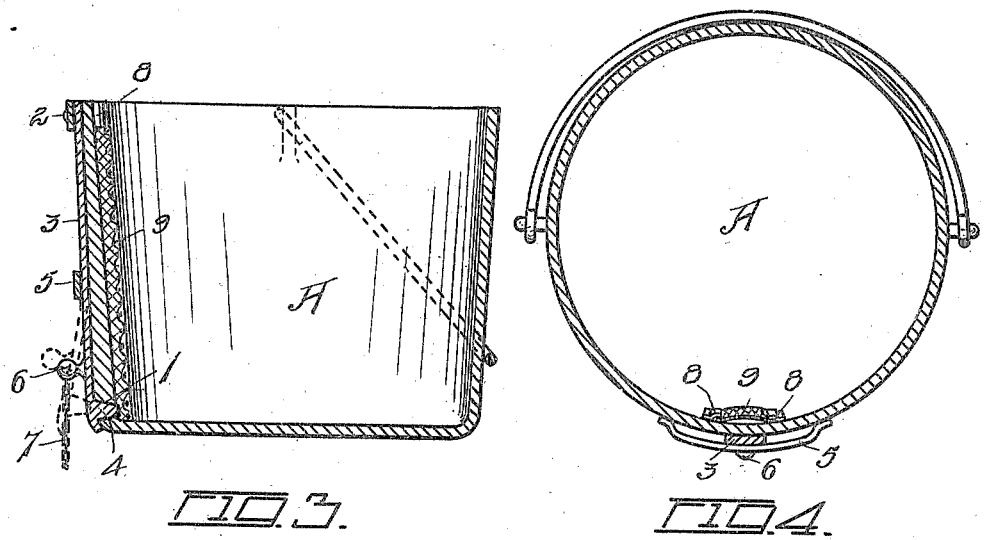
Witnesses:
Helen V. Reap.
Catharine Z. Crenshaw.
Inventor:
Harry M. Taylor;
By F. J. Larson & Co.
Attorneys

UNITED STATES PATENT OFFICE.

HARRY M. TAYLOR, OF DES MOINES, IOWA, ASSIGNOR OF ONE-HALF TO HENRY H. CROW, OF DES MOINES, IOWA.

COOKING UTENSIL.

951,409. Specification of Letters Patent. Patented Mar. 8, 1910.

Application filed July 1, 1907. Serial No. 381,783.

*To all whom it may concern:*

Be it known that I, HARRY M. TAYLOR, of Des Moines, county of Polk, and State of Iowa, have invented new and useful Improvements in Cooking Utensils, of which the following is a specification.

This invention relates to cooking utensils, and particularly to that class thereof employed for boiling vegetables, meats and other articles, and has for its object to provide a vessel of this class which will be simple and inexpensive, and further, one wherein the food may be rinsed or the water drained from the utensil after it has been cooked without having to remove the food therefrom.

The invention is fully described in connection with the accompanying drawings, and the novel features are particularly pointed out in the claim.

Referring to the drawings forming a part of the specification, wherein like characters of reference denote similar parts throughout the several views:—Figure 1, represents a side elevation of a cooking utensil embodying my invention. Fig. 2, is also a side elevation. Fig. 3, is a vertical section on line $x$—$x$ Fig. 1. Fig. 4, is a horizontal section on line $z$—$z$ of Fig. 1.

Referring to the drawings, A, designates a suitable cooking utensil, having near its lower edge a tapering discharge opening 1. Pivotally held by means of the pin 2, near the upper edge of the utensil A, and upon the exterior thereof, is the spring strap 3, being provided near its lower or free end with a stopper or plug 4, which is adapted to closely fit into the discharge opening 1, to prevent leakage when the utensil is filled with food or water.

Engaging the strap 3, intermediate its ends is a cross-bar 5, which is secured at its ends to the utensil A. This bar 5, tends to hold the spring strap 3, in engagement with the outer surface of the utensil as clearly shown in Fig. 3, of the drawings. The spring strap 3, it will be observed is provided near its lower end with a knob 6, to which is secured a chain 7, for removing the stopper for the opening of the utensil.

The interior of the utensil A, is provided with a pair of L-shaped guides 8, between which is held a wire screen to prevent any of the contents within the utensil from passing through the opening 1, when draining water therefrom. This screen is removable and may be taken out whenever desired. Now, when it is desired to drain the water from vegetables or the like, the cook will grasp the knob 6, or chain 7 and swing strap 3, to the position shown in dotted lines in Fig. 3, which is sufficient to remove the stopper 4, from the opening 1. As soon as this has been done the spring strap 3, is swung or carried over to one side as illustrated in Fig. 2, until the water has been drained from the utensil. By this arrangement it will be readily seen that there is no burning of the hands or fingers in handling hot utensils, and that I accomplish the object of my invention by means which is simple in construction and operation.

Having fully described my invention, what I claim is:—

The combination with a cooking utensil having a discharge opening in its side wall near the bottom thereof, of a spring steel arm pivotally secured to the wall of the utensil near the upper edge thereof and in alinement with the discharge opening, an inwardly projecting tapering stopper adapted to enter said discharge opening for closing the same, a knob secured to the exterior face of said spring steel arm adjacent the stopper, a chain secured to said knob, and a horizontally disposed U-shaped cross-bar secured to the wall of said utensil intermediate the ends of said spring steel arm to limit the outward and side movement thereof.

In testimony whereof I have signed my name to the specification in the presence of two subscribing witnesses.

HARRY M. TAYLOR.

Witnesses:
 C. W. EVERETT,
 H. H. CROW.